(12) United States Patent
Baek et al.

(10) Patent No.: US 10,884,096 B2
(45) Date of Patent: Jan. 5, 2021

(54) LOCATION-BASED VOICE RECOGNITION SYSTEM WITH VOICE COMMAND

(71) Applicant: LUXROBO CO., LTD., Seoul (KR)

(72) Inventors: Seungmin Baek, Yeongdeungpo-gu Seoul (KR); Seungbae Son, Seocho-gu Seoul (KR)

(73) Assignee: LUXROBO CO., LTD., Seoul (KR)

( * ) Notice: Subject to any disclaimer, the term of this patent is extended or adjusted under 35 U.S.C. 154(b) by 105 days.

(21) Appl. No.: 16/303,994

(22) PCT Filed: Feb. 13, 2018

(86) PCT No.: PCT/KR2018/001857
§ 371 (c)(1),
(2) Date: Nov. 21, 2018

(87) PCT Pub. No.: WO2019/156272
PCT Pub. Date: Aug. 15, 2019

(65) Prior Publication Data
US 2020/0072937 A1    Mar. 5, 2020

(30) Foreign Application Priority Data

Feb. 12, 2018 (KR) ........................ 10-2018-0017032

(51) Int. Cl.
*G01S 3/803* (2006.01)
*H04W 4/029* (2018.01)
(Continued)

(52) U.S. Cl.
CPC .............. *G01S 3/803* (2013.01); *G10L 15/22* (2013.01); *H04L 67/12* (2013.01); *H04R 1/342* (2013.01);
(Continued)

(58) Field of Classification Search
CPC ... G01S 3/803; G01S 5/20; G01S 5/22; G10L 15/20; G10L 15/22; G10L 15/24;
(Continued)

(56) References Cited

U.S. PATENT DOCUMENTS

| | | | | |
|---|---|---|---|---|
| 4,726,065 A | * | 2/1988 | Froessl | G06F 3/167 704/241 |
| 6,584,439 B1 | * | 6/2003 | Geilhufe | G06F 3/167 704/270 |

(Continued)

FOREIGN PATENT DOCUMENTS

| | | |
|---|---|---|
| JP | 2002-182679 | 6/2002 |
| JP | 2012-169783 | 9/2012 |

(Continued)

*Primary Examiner* — Gerald Gauthier
(74) *Attorney, Agent, or Firm* — Muncy, Geissler, Olds & Lowe, F.C.

(57) ABSTRACT

An object of the present invention is to facilitate recognition of a voice command of a user in a situation where multiple devices including microphones are connected through a sensor network. A relative location of each device is determined and a location and a direction of the user are tracked through a time difference in which the voice command is applied. The command is interpreted based on the location and the direction of the user. Such a method as a method for a sensor network, Machine to Machine (M2M), Machine Type Communication (MTC), and Internet of Things (IoT) may be used for an intelligent service (smart home, smart building, etc.), digital education, security and safety related services, and the like.

21 Claims, 8 Drawing Sheets

(51) Int. Cl.
  *G10L 15/22* (2006.01)
  *H04L 29/08* (2006.01)
  *H04R 1/34* (2006.01)
  *H04R 1/40* (2006.01)
  *H04R 3/00* (2006.01)
  *H04W 4/02* (2018.01)

(52) U.S. Cl.
  CPC ............. *H04R 1/406* (2013.01); *H04R 3/005* (2013.01); *H04W 4/023* (2013.01); *H04W 4/029* (2018.02); *G10L 2015/223* (2013.01)

(58) Field of Classification Search
  CPC . G10L 17/00; G10L 2015/223; G10L 15/063; G10L 15/26; G10L 15/30; G10L 25/84; H04L 67/12; H04L 63/10; H04N 7/14; H04N 7/15; H04R 1/342; H04R 1/40; H04R 1/406; H04R 3/00; H04R 3/005; H04S 7/00; H04S 7/304; H04S 7/305; H04W 4/023; H04W 4/029; H04W 4/20; A61B 5/681; F16M 11/18; H04B 17/318; H04M 3/5158; G06F 3/167
  USPC ....... 340/575; 381/92; 704/9, 226, 231, 232, 704/233, 235, 240, 245, 246, 251, 270, 704/270.1, 275, 277
  See application file for complete search history.

(56) References Cited

U.S. PATENT DOCUMENTS

| | | | | |
|---|---|---|---|---|
| 6,952,672 | B2 * | 10/2005 | Smith | G10L 21/0272 379/387.01 |
| 7,496,500 | B2 | 2/2009 | Reed et al. | |
| 8,054,990 | B2 * | 11/2011 | Gratke | B60R 16/0373 381/122 |
| 8,340,975 | B1 * | 12/2012 | Rosenberger | G10L 15/22 704/270 |
| 9,026,447 | B2 * | 5/2015 | Geldbach | G10L 15/30 704/275 |
| 9,324,326 | B2 * | 4/2016 | Nishikawa | G10L 17/04 |
| 9,432,769 | B1 * | 8/2016 | Sundaram | H04R 3/005 |
| 9,749,583 | B1 * | 8/2017 | Fineberg | H04L 12/28 |
| 9,753,119 | B1 * | 9/2017 | Velusamy | G01S 17/86 |
| 10,735,411 | B1 * | 8/2020 | Hardt | H04L 63/0861 |
| 2006/0074686 | A1 * | 4/2006 | Vignoli | G10L 21/0272 704/275 |
| 2006/0212291 | A1 * | 9/2006 | Matsuo | G10L 21/028 704/231 |
| 2007/0016426 | A1 * | 1/2007 | Hershey | G10L 15/26 704/277 |
| 2009/0055180 | A1 * | 2/2009 | Coon | B60R 16/0373 704/251 |
| 2009/0125311 | A1 * | 5/2009 | Haulick | B60R 16/0373 704/275 |
| 2009/0210227 | A1 * | 8/2009 | Sugiyama | G10L 15/22 704/246 |
| 2010/0014690 | A1 * | 1/2010 | Wolff | H04R 3/005 381/92 |
| 2010/0198598 | A1 * | 8/2010 | Herbig | G10L 15/07 704/240 |
| 2010/0312547 | A1 * | 12/2010 | Van Os | G06F 3/167 704/9 |
| 2013/0073293 | A1 * | 3/2013 | Jang | G10L 15/22 704/275 |
| 2014/0330560 | A1 * | 11/2014 | Venkatesha | G10L 15/26 704/235 |
| 2015/0081298 | A1 * | 3/2015 | Ding | G10L 15/20 704/245 |
| 2015/0095026 | A1 * | 4/2015 | Bisani | H04R 3/005 704/232 |
| 2016/0019026 | A1 * | 1/2016 | Gupta | G10L 21/0272 704/233 |
| 2016/0179752 | A1 * | 6/2016 | Clark | H04W 4/16 704/270.1 |
| 2016/0187856 | A1 * | 6/2016 | Vilermo | A61B 5/0816 340/575 |
| 2017/0076721 | A1 * | 3/2017 | Bargetzi | G10L 15/30 |
| 2017/0180552 | A1 * | 6/2017 | Krinsky | H04M 3/5158 |
| 2018/0047394 | A1 * | 2/2018 | Tian | G10L 17/06 |
| 2018/0090140 | A1 * | 3/2018 | Georges | G10L 15/22 |
| 2018/0139565 | A1 * | 5/2018 | Norris | H04S 7/304 |
| 2018/0174584 | A1 * | 6/2018 | Chih | F16M 11/10 |
| 2018/0227719 | A1 * | 8/2018 | Chong | H04L 67/10 |
| 2018/0254040 | A1 * | 9/2018 | Droppo | G10L 15/20 |
| 2018/0255418 | A1 * | 9/2018 | Tzirkel-Hancock | H04R 1/406 |
| 2018/0332389 | A1 * | 11/2018 | Ekkizogloy | G10L 15/26 |
| 2018/0358009 | A1 * | 12/2018 | Daley | G06F 3/167 |
| 2019/0051304 | A1 * | 2/2019 | Tian | G10L 25/51 |
| 2019/0058847 | A1 * | 2/2019 | Mayer | H04N 7/15 |
| 2019/0174226 | A1 * | 6/2019 | Yang | G10L 15/22 |
| 2020/0072937 | A1 * | 3/2020 | Baek | G01S 5/18 |
| 2020/0092681 | A1 * | 3/2020 | Shapiro | G16H 10/60 |

FOREIGN PATENT DOCUMENTS

| | | |
|---|---|---|
| JP | 2014-083658 | 5/2014 |
| JP | 2005-316953 | 4/2017 |
| KR | 10-2005-0030906 | 3/2005 |
| KR | 10-2017-0044419 | 4/2017 |

* cited by examiner

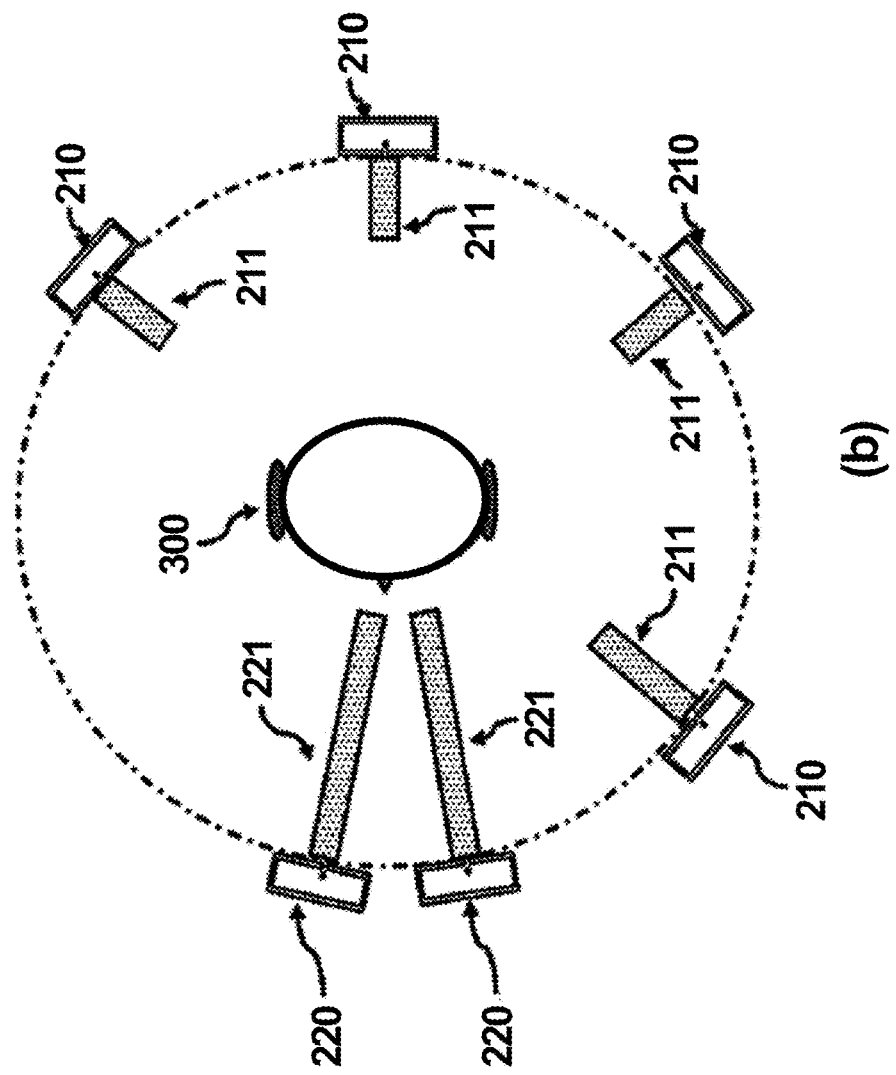
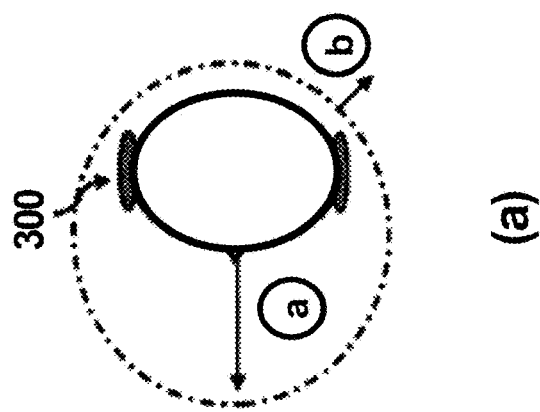
FIG. 6

LOCATION-BASED VOICE RECOGNITION SYSTEM WITH VOICE COMMAND

TECHNICAL FIELD

The present invention relates to a location tracking and location-based voice recognition system using a voice command, and more particularly, to a location tracking device and a location-based voice recognition service that facilitate recognition of a voice command of a user in a situation in which multiple devices including a microphone are connected through a sensor network. This research is a research supported by the commercialization technology development project of the Ministry of Commerce, Industry and Energy.

BACKGROUND ART

Recently, technologies for controlling various devices through voice commands have become increasingly popular. In particular, application of the voice commands to various devices such as household appliances such as a refrigerator, a TV, or the like or lighting has been spreading. However, with the spread of the application of the voice commands, a possibility that an operation undesired by a user will be caused is increasing. When a plurality of devices uses the same voice command, for example, when the plurality of devices operates through speaking the same voice command like an operation of turning on a switch or the like, a possibility that operations undesired by a device undesired by the user will be caused increases.

In order to solve such a problem, in the related art, methods for determining a gaze of the user using a camera or an infrared pointer are used (U.S. Pat. Nos. 9,825,773, 6,970,824) or a method for estimating a direction of a sound source by installing multiple microphones in the same device is also used (U.S. Pat. No. 9,554,208).

When the camera or infrared pointer is used as in the related art or when multiple microphones are installed in the same device, additional sensors are required, and as a result, manufacturers have a large cost burden and also have a large burden of development for implementing various sensor devices.

Accordingly, there is a desperate need for a technology that can grasp an intention of the user in the voice command and control the desired operation of the desired device by voice.

DISCLOSURE

Technical Problem

In order to solve the problems, the present invention has been made in an effort to provide a location-based voice recognition service capable of determining an utterance direction of a user by using a plurality of microphones and specifying a command target device within a range of the determined utterance direction.

In particular, the method is aimed at facilitating recognition of a voice command of the user in a situation where multiple devices including the microphones are connected through a sensor network. Accordingly, a relative location of each device as a target of the voice command is determined and a location and a direction of the user are tracked through a time difference in which the voice command is applied. The command is interpreted based on the location and the direction of the user.

Technical Solution

In order to achieve the technical object, a location-based voice recognition system according to the present invention includes: a plurality of voice command receiving devices including at least one microphone; and a sensor network control device connected with the plurality of voice command receiving devices through a sensor network, in which the sensor network control device includes a sensor location determining unit determining relative locations of the plurality of voice command receiving devices, a user location calculating unit calculating a location of a user based on the relative locations, an utterance direction calculating unit calculating a converted voice magnitude based on voice magnitudes of the plurality of respective voice command receiving devices and determining an utterance direction range of the user based on the converted voice magnitude, and a target device selecting unit selecting a target voice command receiving device as a target of a voice command among the plurality of voice command receiving devices according to the utterance direction range, and the converted voice magnitude may be a voice magnitude when it is assumed that the plurality of voice command receiving devices is at the same distance from the user.

In this case, the utterance direction calculating unit may acquire the voice magnitudes of the plurality of respective voice command receiving devices by using a sound attenuation model and thereafter, calculate the converted voice magnitude based on the voice magnitudes of the plurality of respective voice command receiving devices.

Advantageous Effects

In the related art, as a method for inducing an utterance direction, a gaze of a user, an additional camera, or an infrared pointer is used. Such an additional device has disadvantages including cost burden, and difficulty in implementation and use. However, the present invention facilitates determining an intention depending on a location of the user by using a microphone receiving a voice command. Further, the present invention may provide an enhanced service to the user by using location information of the user and utterance direction information to give a command.

Such a method can be used for various services including an intelligent service (smart home, smart building, etc.) based on technologies such as a sensor network, Machine to Machine (M2M), Machine Type Communication (MTC), and Internet of Things (IoT), digital education, security and safety related services, and the like.

DESCRIPTION OF DRAWINGS

FIG. 6 is a diagram for describing an utterance direction determining operation according to an embodiment of the present invention.

BEST MODE FOR CARRYING OUT THE INVENTION

The contents illustrate only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and embodiments mentioned in the present specification are obviously intended only to allow those skilled in the art to understand a concept of the present invention in principle, and the present invention is not limited to embodiments and states particularly mentioned as such.

The above-mentioned objects, features, and advantages will become more obvious from the following detailed description associated with the accompanying drawings. Therefore, those skilled in the art to which the present invention pertains may easily practice a technical idea of the present invention. Hereinafter, the present invention will be described with reference to the accompanying drawings.

Figure 1:
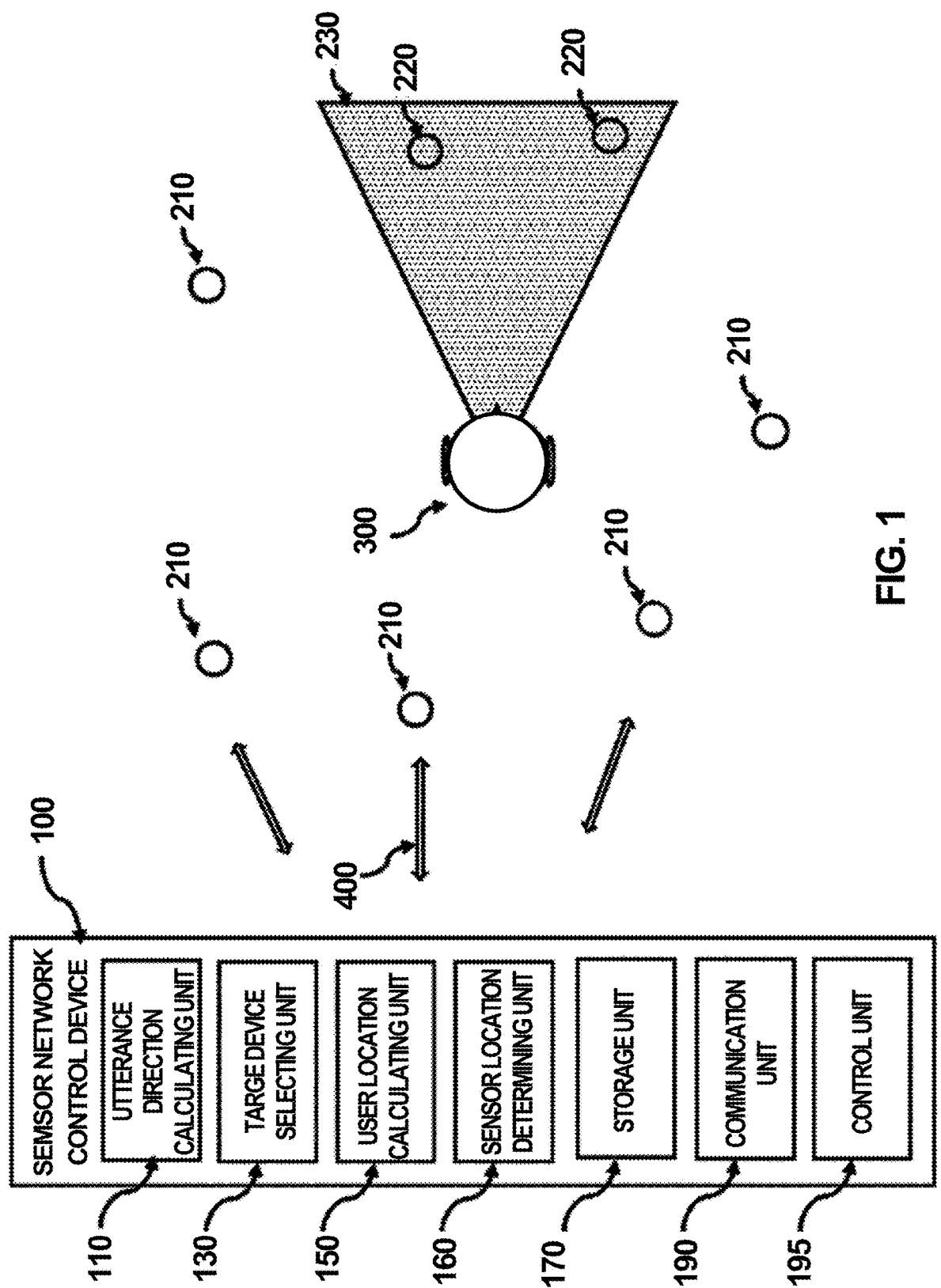
FIG. 1 is a block diagram of a location-based voice recognition service system according to an embodiment of the present invention.
Figure 2:
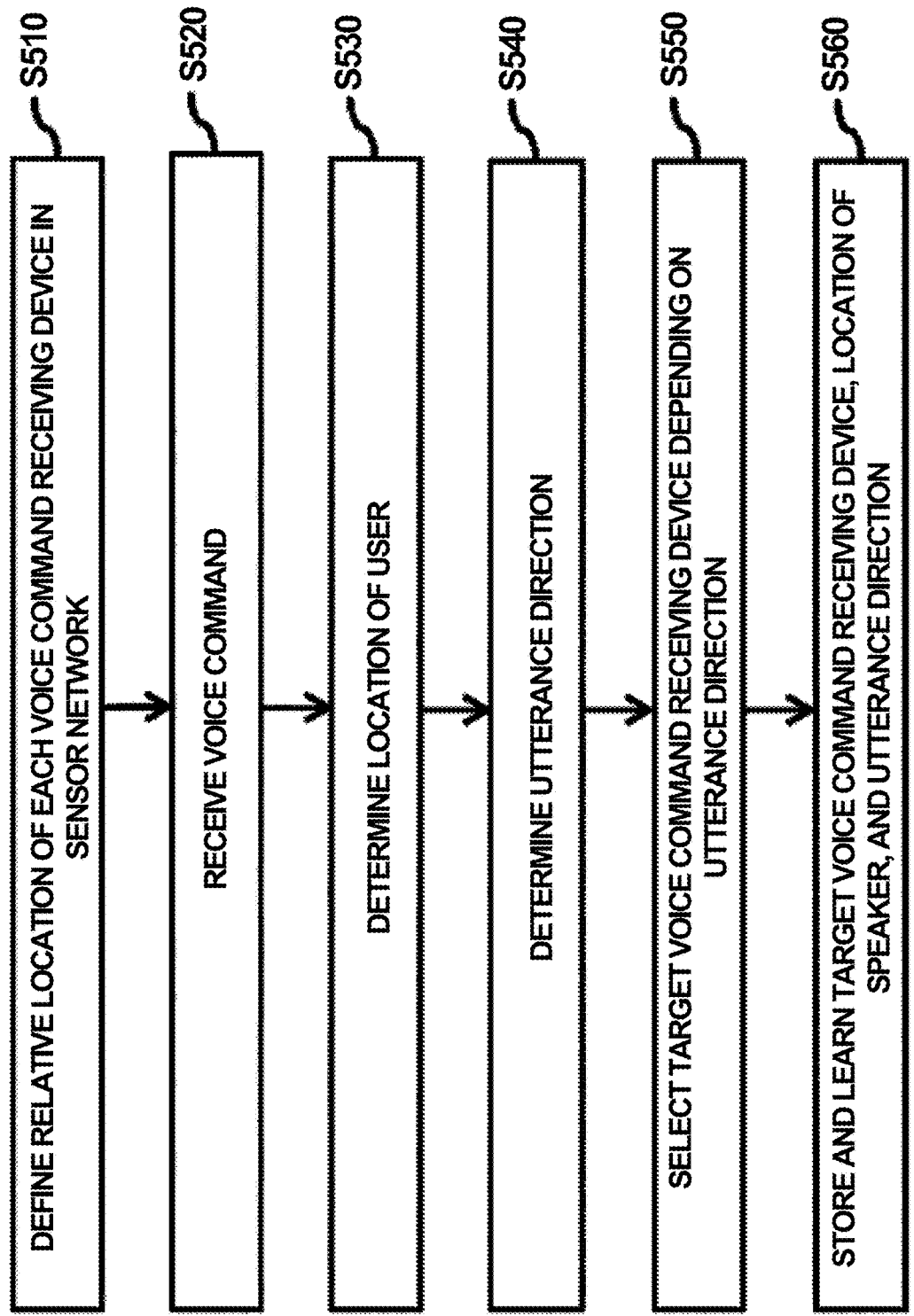
FIG. 2 is a flowchart of a location-based voice recognition service operation according to an embodiment of the present invention.

FIG. 1 is a block diagram of a location-based voice recognition service system according to an embodiment of the present invention.

Referring to FIG. 1, a location-based voice recognition service system according to an embodiment of the present invention includes voice command receiving devices 210 and 220 including at least one microphone connected through a sensor network and a sensor network control device 100. In this case, the sensor network control device 100 may be any one of a cellular phone, an artificial intelligence secretary (smart speaker), a personal computer (PC), any one of individual voice command receiving devices 210 and 220, a wearable device (smart watch, etc.), and any one of various devices which may perform a computing function, such as a server or the like.

When a voice command of a user 300 is spoken, the voice command receiving devices 210 and 220 receive the voice command of the user 300 and transmit the voice command, a voice arrival time, and a voice size to the sensor network control device 100. Here, the "voice command" of the present invention is a concept that includes both a command for requesting operations of the voice command receiving devices 210 and 220 through speaking voice of the user and a query for requesting answers of the voice command receiving devices 210 and 220. For example, a command "turn to channel 7" toward a TV and a query "what is a channel you are watching now" toward the TV which are given by the user are also included in a scope of the "voice command" of the present invention.

In this case, when the user utters the voice, the sensor network control device 100 may verify whether contents of utterance is the voice command or contents irrelevant to the voice command receiving devices in the sensor network.

Here, the voice command receiving devices 210 and 220 may mean all devices including sensors capable of inputting sound through a microphone. For example, various appliances such as a lighting switch, the TV or a refrigerator, and various devices and sensors including other microphones such as a mobile phone may all correspond to the voice command receiving devices.

According to FIG. 1, the sensor network control device 100 may include an utterance direction calculating unit 110, a target device selecting unit 130, a user location calculating unit 150, a sensor location determining unit 160, a storage unit 170, a communication unit 190, and a control unit 195. In this case, the sensor network control device 100 is connected to the voice command receiving devices 210 and 220 and a sensor network 400 through the communication unit 190.

In this case, the sensor network 400 may be an internal network connected to connected to a router, or may be an external network such as the Internet, a Long Range (LoRa) network, Narrowband-Internet of Things (NB-IoT), an LTE network, or the like. Further, the sensor network control device 100 may be, for example, a device having a computing function such as a server, a PC, a tablet, a mobile phone, or the like.

In addition, the communication unit 190 as a device for communicating with the voice command receiving devices 210 and 220 may be a wireless communication device such as WiFi, ZigBee, Bluetooth, etc., and may be a wired communication device such as Ethernet, Power Line Communication (PLC), etc.

DESCRIPTION OF EMBODIMENTS

Hereinafter, a specific operation of a sensor network control device 100 will be described with reference to FIGS. 2 to 6.

The sensor network control device 100 may first calculate and estimate a relative location of each device connected to a sensor network (step S510).

As a method for estimating the relative location, for example, the following methods may be used.

1) A sensor location determining unit 160 of the sensor network control device 100 may calculate a signal magnitude delivered to the sensor network 400 and the relative location of each device connected to the sensor network based on a beacon signal magnitude when a beacon is installed in one or more voice command receiving devices 210 and 220 among the voice command receiving devices on the sensor network 400. Alternatively, any one of the voice command receiving devices 210 and 220 includes a device that generates a specific signal, which serves as the beacon and the sensor location determining unit 160 may calculate the relative location of each of the voice command receiving devices 210 and 220 on the radio sensor network 400 by calculating a direction in which the specific signal reaches and the relative locations with the voice command receiving devices 210 and 220 serving as the beacon based on signal magnitudes received by other voice command receiving devices.

In this case, instead of the beacon signal, when the sensor network 400 is a radio communication network, the relative location of each device connected to the sensor network may be calculated by using a signal magnitude (for example, received signal strength indication (RSSI)) of the radio communication signal.

2) Alternatively, the sensor location determining unit 160 of the sensor network control device 100 may perform a mode to calculate the relative location at the time of initial setting or when necessary. In this case, each node of the sensor network 400 emits sound at a specific frequency and receives the emitted sound through microphones of the voice command receiving devices 210 and 220. In respect to the emitted sound at the specific frequency, values input in the microphone are analyzed to create a map for a physical feature such as diffraction/reflection/absorption of sound according to each location around each node (voice command receiving device). The relative location of each of the voice command receiving devices 210 and 220 on the sensor network may be calculated by using the map for such a physical feature.

In this case, the microphone may adopt a beamforming microphone. The beamforming microphone is configured so that an attenuation rate thereof is determined according to a location of a microphone array included therein and an incident angle of sound. The relative location of each of the voice command receiving devices 210 and 220 on the sensor network 400 may be calculated based on the beamforming microphone and the calculated attenuation rate.

3) Alternatively, the relative location may be calculated through using an additional device of each of the voice command receiving devices 210 and 220.

For example, each of the voice command receiving devices 210 and 220 may additionally include an LED lamp. In this case, each of the voice command receiving devices 210 and 220 turns on/turns off the LED lamp according to a specific rule. In addition, a camera for a portable device receives turn-on/turn-off of the LED lamp. Further, the sensor location determining unit 160 detects the relative location of each of the voice command receiving devices 210 and 220 based on whether to receive the turn-on/turn-off of the LED lamp, a receiving direction, and the like. The relative location of each of the voice command receiving devices 210 and 220 on the sensor network 400 may be calculated by integrating detected location information.

4) Alternatively, the sensor location determining unit 160 of the sensor network 400 may directly receive a physical location of each of the voice command receiving devices 210 and 220 from a user 300 into a system and use the location information.

In the above description, it is exemplified that the sensor location determining unit 160 determines the relative locations of the voice command receiving devices 210 and 220 through various methods, but those skilled in the art may determine the relative location of each of the voice command receiving devices 210 and 220 by various methods in addition to the aforementioned method.

Thereafter, when the voice command of the user 300 is uttered, the microphones of the respective voice command receiving devices 210 and 220 receive voice commands (step S520).

Meanwhile, a user location calculating unit 150 of the sensor network control device 100 calculates the relative location of the user 300 by using a time difference of application (arrival) (TDOA) of a voice signal applied to a sensor (microphone) within each voice command receiving device and relative location information of each voice command receiving device (step S530).

In this case, a plurality of microphones is installed in each voice command receiving device, thereby increasing the ease of location tracking.

Meanwhile, when the total number of microphones of the voice command receiving devices 210 and 220 within the sensor network or the number of microphones receiving the voice command is small and it is thus difficult to definitively acquire the location of the user, the total number of microphones and the number of microphones may be approximated and estimated.

1) For example, a method may be used, which partitions an indoor space in which the sensor network is installed into predetermined zones and estimates and maps the location of the user to the partitioned zones according to the magnitude of the voice command applied to the microphone.

2) Alternatively, for example, a location where locatable areas of the user overlap with each other may be estimated as an area where the user is positioned based on distances calculated from at least two voice command receiving devices 210 and 220.

3) Alternatively, based on information on locations of the voice command receiving devices 210 and 220 in the sensor network and map information of a corresponding place and additional information regarding in which part of an indoor environment of the corresponding place the voice command is reflected/diffracted/absorbed, the location of the user may be estimated.

4) Alternatively, a mobile device possessed by the user generates the radio signal or beacon signal and the signal is received by each voice command receiving device on the sensor network 400.

In this case, the location of the user may be estimated based on the magnitudes and reach angle information of the signals received by the voice command receiving devices on the sensor network 400.

5) Alternatively, information on a walking speed and a walking direction of the user may be inferred based on stepping sound of the user and accumulated to infer a current location of the user.

6) Alternatively, the relative location of the user may be estimated through matching between feature points between an image captured by the camera possessed by the user and an image captured by the voice command receiving device of each radio network.

Those skilled in the art may calculate the relative location of each voice command receiving device on the sensor network 400 by using visible light, infrared rays, ultraviolet rays, and the like in addition to the sound, in addition to the aforementioned method.

In addition, an utterance direction calculating unit 110 of the sensor network control device 100 may calculate and determine the utterance direction of the user 300 (step S540).

Hereinafter, a specific operation of determining the utterance direction will be described with reference to FIGS. 3 to 6.

Figure 3:
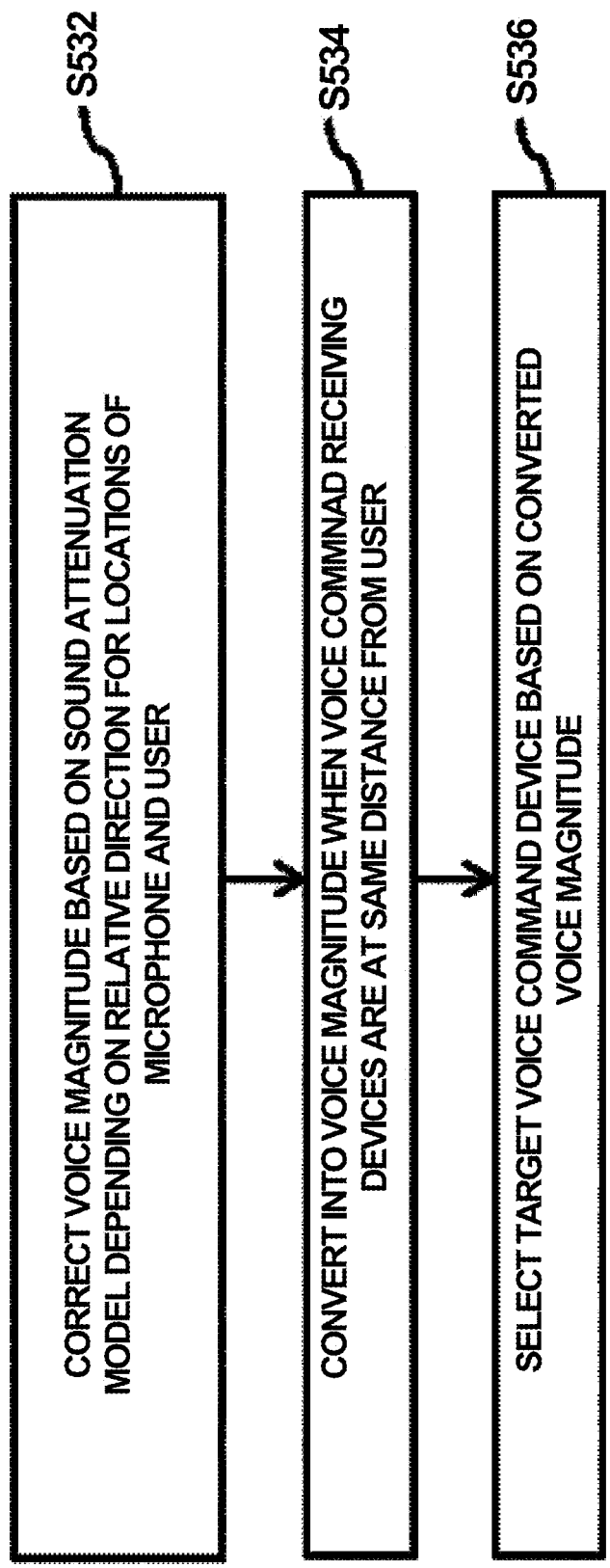
FIG. 3 is a flowchart for an utterance direction determining operation according to an embodiment of the present invention.
Figure 4:
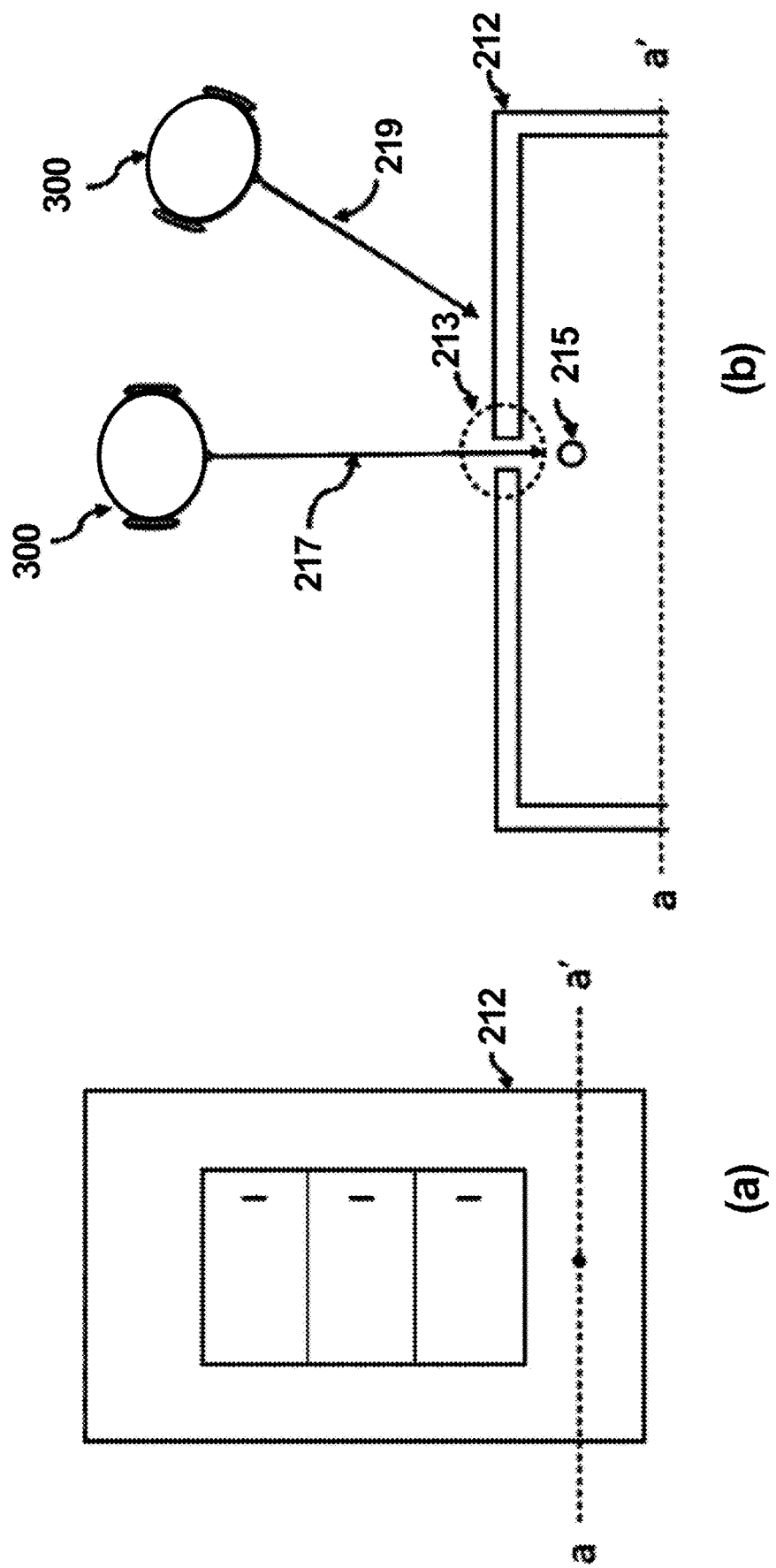
FIG. 4 is a diagram illustrating a voice command receiving device according to an embodiment of the present invention.

According to FIG. 3, the utterance direction calculating unit 110 applies a sound attenuation model based on an influence of a housing of each voice command receiving devices 210 or 220 or a directivity of the microphone to correct a volume applied to each of the voice command receiving devices 210 and 220 according to a relative direction for the location of the user 300 (step S532).

Since the voice command receiving devices 210 and 220 including a microphone 215 generally have a housing 212, a receiving strength of the voice varies depending on the direction when the voice is received. More specifically, the voice command receiving devices 210 and 220 will be described with reference to FIG. 4, which is an embodiment in which the voice command receiving devices 210 and 220 are implemented as a lighting switch. However, the voice command receiving devices 210 and 220 of the present invention are not limited thereto.

FIG. 4(a) illustrates a case where the voice command receiving devices 210 and 220 according to the embodiment of the present invention are the lighting switches and FIG. 4(b) is a diagram illustrating a cross-section of part a-a' of the lighting switch of FIG. 4(a).

In this case, a voice 217 delivered through an opening 213 in front of the microphone 215 and a voice 219 delivered through the housing 212 are different in magnitude and different in sound attenuation model.

Figure 5:
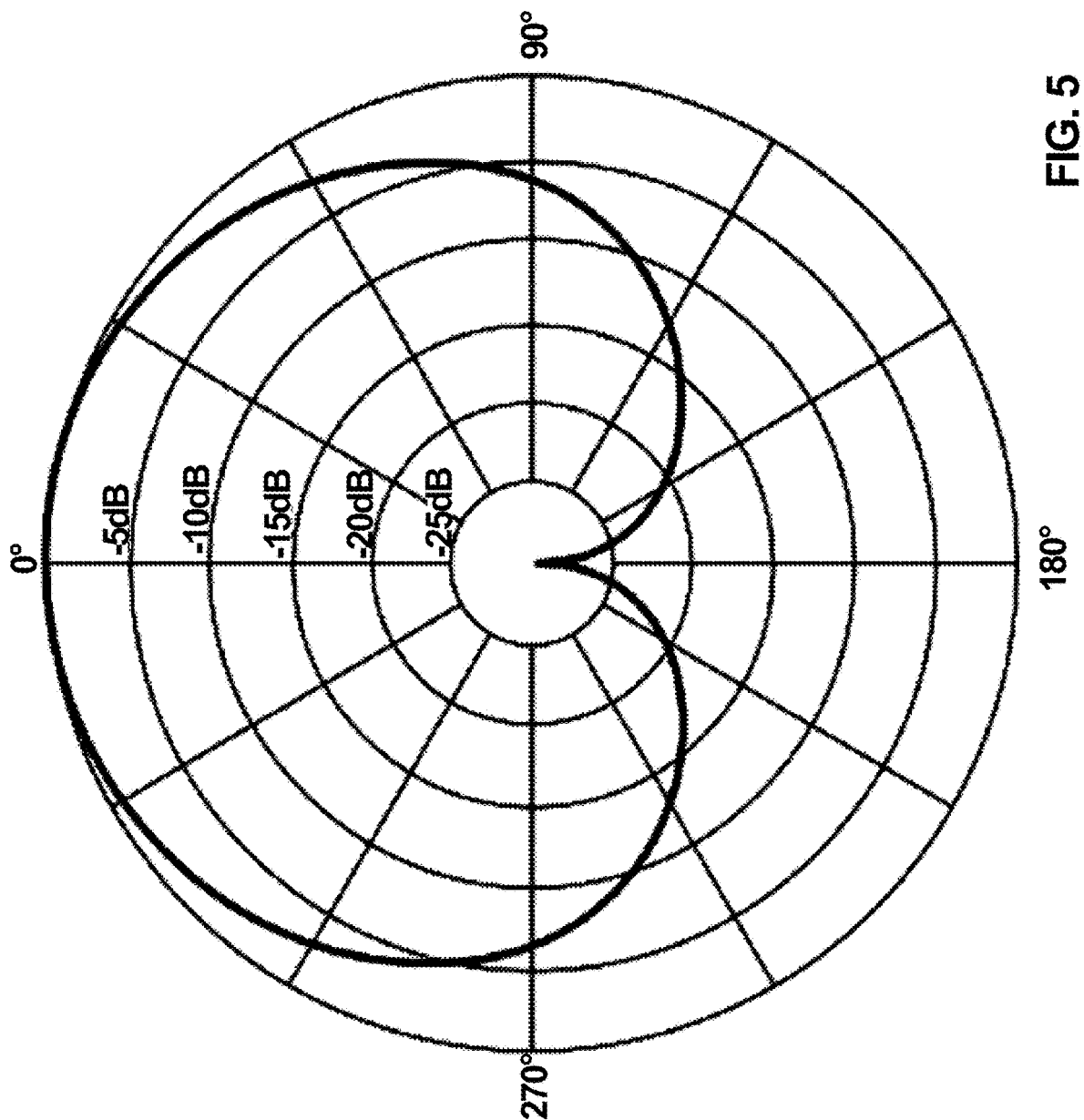
FIG. 5 is a graph illustrating a polar pattern of a directional microphone according to an embodiment of the present invention.

Alternatively, when the microphone 215 has the directivity, for example, when a beamforming microphone is used, the microphone 215 has a polar pattern depending on the direction. FIG. 5 is an exemplary graph for a polar pattern in which the microphone 215 shows the directivity. Accordingly, in this case, a larger sound is input in a directional microphone when the sound is applied in a specific direction.

Therefore, in the embodiment of the present invention, in order to derive an accurate utterance direction, the directivity of the microphone 215 or the sound attenuation model depending on the influence of the housing is applied to correct the volume applied to each of the voice command receiving devices 210 and 220.

In this case, each of the voice command receiving devices 210 and 220 may subsidiarily further include an auxiliary direction sensor such as a geomagnetic sensor in order to derive an accurate direction.

Alternatively, when the sound attenuation model is applied, in a case where there are voice command receiving devices 210 and 220 in which the attenuation depending on the direction does not occur or attenuation depending on the direction of an almost negligible level occurs, the voice command receiving devices 210 and 220 are selected to use sound magnitudes for the selected voice command receiving devices 210 and 220.

Thereafter, the utterance direction calculating unit 110 applies each of the voice command receiving devices 210 and 220 and an attenuation model of the sound depending on the distance by using the calculated location information of the user to convert and calculate the volume when each device is at the same distance (step S534).

Referring to FIG. 6(a), when the user 300 utters the sound, the sound is more easily delivered in a face direction (utterance direction, ⓐ) and the sound is more attenuated and delivered to a direction (ⓑ) of a rear surface of the face.

Therefore, in order to derive the utterance direction by using the magnitude of the sound, the voice magnitude calculated in step S532 is converted into a magnitude of the voice assuming the voice command receiving devices are at the same distance from the user 300 as illustrated in FIG. 6(b). In the case of the voice command receiving device 220 which is in the utterance direction, the converted voice magnitude 221 is calculated to be large and in the case of the voice command receiving device 210 which is not in the utterance direction, the converted voice magnitude 211 is calculated to be relatively small. Therefore, it is possible to accurately acquire the utterance direction through conversion of the voice magnitude.

Based on the last converted volume, a model for the voice magnitude received by each sensor which is at the same distance depending on the utterance direction is applied to calculate and determine an utterance direction range (see reference numeral 230 of FIG. 10) of the user (step S536).

In this case, the utterance direction range may be determined as a predetermined range (for example, a range of 15 degrees in a left/right direction centering on the direction in which the converted voice magnitude 211 is largest) centering on the direction in which the converted voice magnitude 211 is largest.

Alternatively, when the voice command receiving device which is in the direction in which the converted voice magnitude 211 is largest and a voice command receiving device which is in a direction in which the converted voice magnitude 211 is second largest are neighboring to each other, a predetermined range (e.g., 30 degrees) may be the utterance direction centering on a weight center or intermediate angle between two voice command receiving devices.

In this case, when it is difficult to definitely acquire the direction of the user, a method for approximating and estimating the number of microphones receiving the voice is used as follows.

1) For example, as illustrated in FIG. 6(a), a ratio of the voice magnitude depending on the utterance direction is acquired in advance to calculate a voice magnitude model depending on the utterance direction and thereafter, a ratio of the converted voice magnitudes is acquired and applied to the voice magnitude model depending on the utterance direction to approximate and estimate the utterance direction of the user 300.

2) Alternatively, the size of the voice command of the user in a normal state which is not influenced by an external factor may be stored and thereafter, the utterance direction may be approximated and estimated based on the size of the voice command which is not influenced by the external factor.

Specifically, when the voice command is applied, a command direction may be inferred based on a model for an attenuation rate of the size of the voice command which is not influenced by the external factor and the size depending on the utterance direction. Alternatively, the utterance direction of the user may be inferred by using map information for a physical characteristic such as reflection/absorption of the sound in an indoor environment when the voice command is applied.

3) Alternatively, the utterance direction of the user may be determined through voice command direction information of the user, which is input in the beamforming microphone of the user, direction information (when external sound does not exist, the external sound is replaceable with sound artificially generated in each wireless network) of the external sound which is input from the outside of the user, and information on a direction observed by the voice command receiving device of each wireless network. In this case, the beamforming microphone is replaceable with a microphone housed in a special form so as to receive the sound only in a specific direction.

Figure 7:
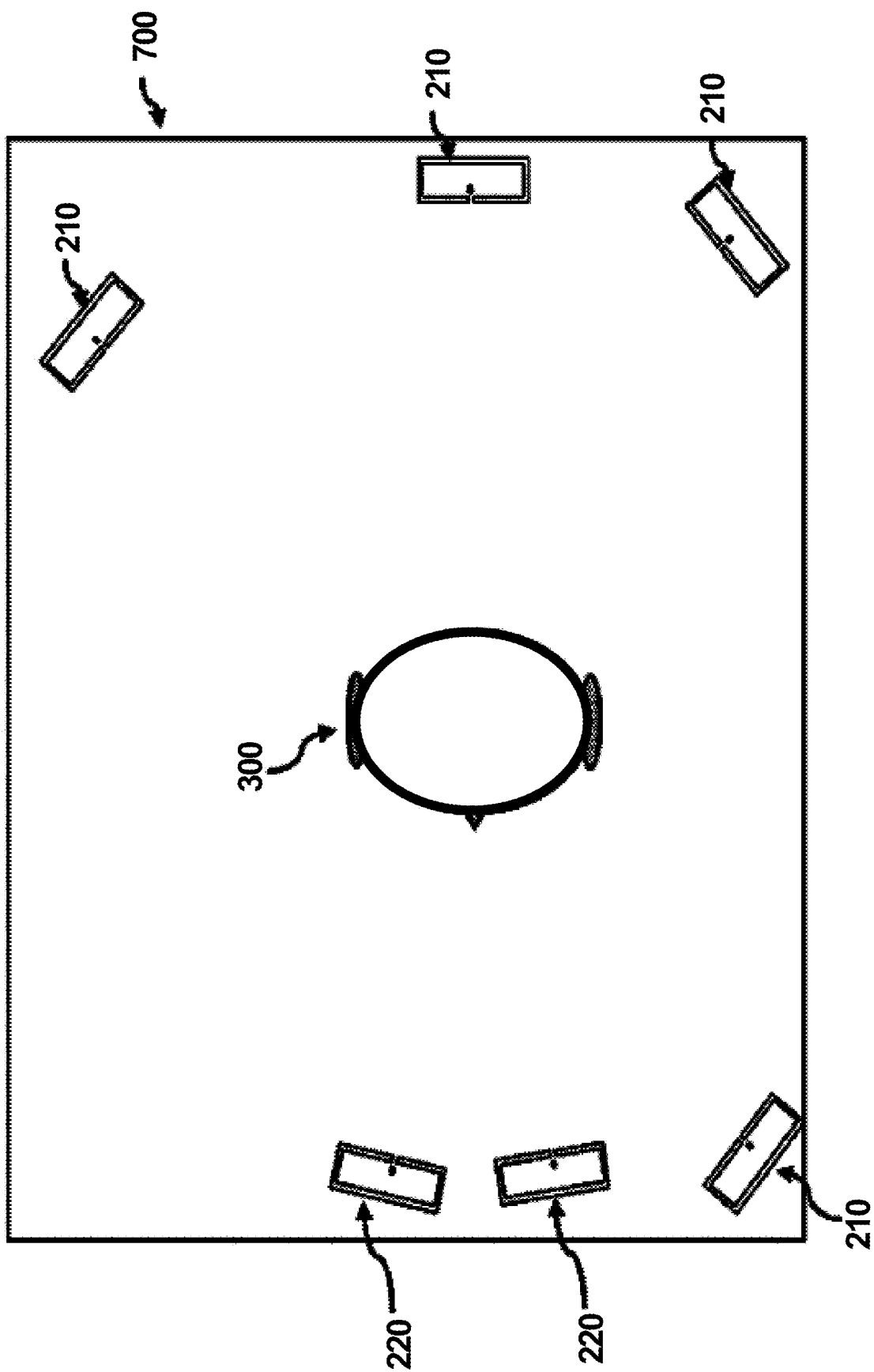
FIG. 7 is a diagram for describing an utterance direction determining operation according to an embodiment of the present invention.

4) Alternatively, when the beamforming microphone is positioned at an edge of a space in which each of the voice command receiving devices 210 and 220 is used as illustrated in FIG. 7, it is assumed that the user gives the command inside the space and thereafter, and strengths detected in the space in which each of the voice command receiving devices is used are compared to infer the utterance direction of the user.

5) Alternatively, based on the converted volume magnitude after assuming that each voice command receiving device is at the same distance, a direction in which the converted volume magnitude is largest may be determined as the utterance direction.

Referring back to FIG. 2, a target device selecting unit 130 of the sensor network control device 100 derives the voice command receiving device 220 as a target of the voice command by referring to the utterance direction range 230 and the location information of the user 300 while interpreting the voice command of the user 300 (step S550).

In this case, in order to facilitate the interpretation of the voice command of the user 300, the voice command receiving devices 220 included in the utterance direction range 230 of the user are selected and a voice command target is limited to the selected voice command receiving devices 220 to facilitate a voice command target determining process.

Figure 8:
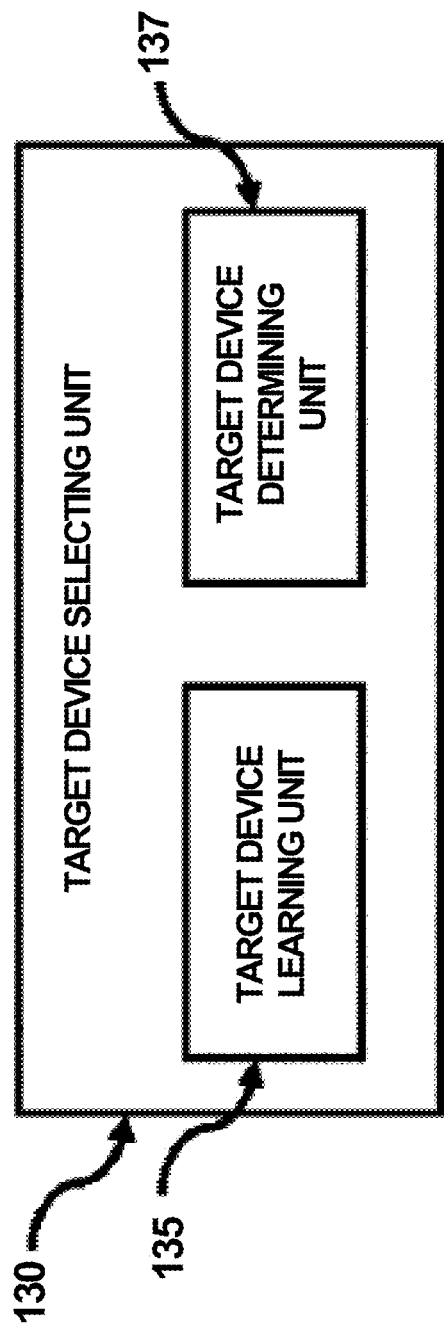
FIG. 8 is a detailed block diagram of a target device selecting unit according to an embodiment of the present invention.

Referring to FIG. 8, the target device selecting unit 130 includes a target device learning unit 135 and a target device determining unit 137 in order to interpret the voice command.

The target device learning unit 135 performs machine learning for selecting the target device.

In the machine learning, the learning is performed by referring to contextual and environmental elements of the voice command. In particular, in order to refer to the contextual and environment element, the target device learning unit 135 of the sensor network control device 100 may, i.e., have attribute information for each of the voice command receiving devices 210 and 220.

For example, the attribute information may include relative or absolute location information of the voice command receiving devices 210 and 220, information for functions, clustering information, an operation sequence of the functions, and a voice command history.

The relative or absolute location information of the voice command receiving devices 210 and 220 means a relative location or an absolute location of each voice command receiving device determined in an initial step (S510).

The information for functions indicates types of voice command receiving devices 210 and 220, for example, whether each of the voice command receiving devices 210 and 220 is, for example, a lighting device or a speaker and may further include detailed functional information of each device, for example, detailed functional information such as a defroster function of a refrigerator or a blowing/cooling mode of an air-conditioner.

The clustering information may mean information acquired by partitioning the indoor space, for example, may be indoor space information such as a main room, a bedroom, a living room, or the like.

The operation sequence of the functions is used for determining a contextual meaning and for example, when one voice command receiving device 210 or 220 is a rice cooker, the operation sequence may be an operation sequence such as initial heating, a mooring mode, and a warmth keeping mode. Alternatively, the operation sequence may be an integrated operation sequence of various voice command receiving devices 210 and 220. For example, the operation sequence may be information indicating that the operation of a drier is performed after the operation of a washing machine or that the operation of a microwave oven is performed after a door of the refrigerator is opened.

The voice command history may include user information, the utterance direction, the utterance contents, user utterance location information, and whether to succeed in the voice command and may be stored whenever the voice command is uttered.

The user information is information for extracting information corresponding to a voice feature of the user from the voice command input through voice utterance of the user for a predetermined amount of time, generating a speaker model using the extracted information as training data and configuring a speaker identifier by registering the corresponding speaker as the user, and identifying a specific user among registered users by using the voice uttered from the user based on the configured speaker identifier.

The utterance direction, the utterance contents, and the user utterance location information mean the utterance direction determined by the utterance direction calculating unit 110, a text type voice command, and the utterance location calculated by the user location calculating unit 150 at the time of uttering the voice command.

Whether to succeed in the voice command as information for determining whether the voice command is normally interpreted may be determined according to whether continuous commands are performed with the same utterance contents in a specific utterance direction during a specific time interval or whether there is a negative in the continuous commands (e.g., "No", etc.). For example, when a command "turn off it" is followed by a command "No, turn on the lighting" after the TV is turned off, the voice command "turn it off" may be stored as a target not properly being selected.

The target device learning unit 135 may calculate and store a probability that a specific user will give a command having a certain content to a certain target device in a certain utterance direction by using the above-described attribute information. For example, when user A is likely to utter a voice command to turn off the lighting in a ceiling direction at 9:00 pm, user A may calculate a probability of selecting a specific target device based on command contents/utterance direction of a specific user.

The target device learning unit 135 may be learned through, for example, methods including a support vector machine, a hidden Markov model, regression analysis, a neutral network, Naïve Bayes classification, and the like.

The target device determining unit 137 basically derives the voice command receiving device 220 as the target of the voice command by referring to the utterance direction range 230 and the location information of the user 300. However, additionally, the target device determining unit 137 may determine the contextual meaning of the voice command based on the attribute information machine-learned by the target device learning unit 135.

In this case, when an intention of the voice command and the designed voice command receiving devices 210 and 220 are clear, the voice command may be performed without interpretation of the contextual meaning.

For example, when a command "turn off a lighting apparatus in the main room" is given, since the intention (turn off) of the performed voice command and the voice command receiving devices 210 and 220 that are to perform the voice command are clear, it may not be necessary to interpret a separate contextual meaning.

However, in the case of an unclear command such as putting a pronoun in the voice command, the contextual meaning of the voice command may be interpreted by using the utterance direction and the location of the user.

For example, when there is the voice command "turn it on", since the target voice command receiving devices 210 and 220 are unclear, the contextual interpretation is required.

In this case, in order to interpret a pronoun "it", the attribute information, the location of the user, and the utterance direction information may be used.

When the user is positioned in the main room and the user utters the voice command in the ceiling direction in which there is the lighting apparatus, the lighting apparatus may be turned off through the contextual interpretation.

In particular, in the case of the continuous commands, when a change in utterance direction is within a predetermined range, it may be contextually regarded that the commands are given to the same voice command receiving devices 210 and 220. For example, when after the command "turn on the lighting in the main room", the voice command "turn it off again" is applied again when the change in utterance direction of the user is within a predetermined range, the target device may be determined as the lighting apparatus according to the contextual interpretation.

Alternatively, the target voice command receiving device may be selected by storing locations (e.g., locations of a bed and a desk) of other additional elements in a storage unit of the sensor network control device 100 and referring to a fact that the voice command is uttered on the bed when the user 300 gives the command on the bed.

Last, the storage unit 170 of the sensor network control device 100 may store information on the voice command target device, the location of the user, and the utterance direction (step S560). Accordingly, the stored information may be used in the target device learning unit 135 as data for interpreting the voice command when there is the voice command later.

For example, when information as to at which location, in which direction, by which intention, and to which target the command is issued is accumulated, stored, and learned as a history and when the corresponding command is repeated or a similar command is received, the interpretation is facilitated based on the learned contents. For example, when the user 300 repeats an action of turning off the lighting switch by setting the ceiling direction as the utterance direction on the bed in a night time zone, the information is combined to refer to selecting and controlling the target voice command receiving device in next voice command utterance of the user.

Additionally, a control unit 195 may transmit a control signal to the selected target voice command receiving device 220. For example, the control unit 195 may control turn-on/turn-off of the lighting switch through the control signal when the target voice command receiving device 220 is the lighting switch or a lighting system. Alternatively, for example, when the target voice command receiving device 220 is the television, the control unit 195 may transmit various control signals including on/off, volume adjustment, channel change, and the like of the television. Alternatively, when the target voice command receiving device 220 is an audio, the control unit 195 may transmit various control signals including the on/off, the volume adjustment, the channel change, and the like of the audio.

However, as described above, the volume adjustment, the channel change, and the like may be duplicated commands in the audio and the TV and the on/off (turn-on/turn-off) may be duplicated commands in the lighting, the audio, the TV, and the like. Therefore, the contents of the voice command may be duplicated. However, according to the present invention, since the utterance direction of the user is considered, an undesired operation of an undesired device may be prevented due to the duplicated voice command.

However, the present invention facilitates determining an intention depending on a location and a direction of the user by using only a microphone receiving a voice command. An enhanced service may be provided to the user by using direction information to issue the command as well as information depending on the location.

Such a method as a method for a sensor network, Machine to Machine (M2M), Machine Type Communication (MTC), and Internet of Things (IoT) may be used for an intelligent service (smart home, smart building, etc.), digital education, security and safety related services, and the like.

The above description just illustrates the technical spirit of the present invention and various changes, modifications, and substitutions can be made by those skilled in the art to which the present invention pertains without departing from an essential characteristic of the present invention.

Therefore, the embodiments and the accompanying drawings disclosed in the present invention are used to not limit but describe the technical spirit of the present invention and the scope of the technical spirit of the present invention is not limited by the embodiments and the accompanying drawings. The protective scope of the present invention should be construed based on the following claims, and all the technical concepts in the equivalent scope thereof should be construed as falling within the scope of the present invention.

INDUSTRIAL APPLICABILITY

In the related art, as a method for inducing an utterance direction, a gaze of a user, an additional camera, or an infrared pointer is used. Such an additional device has disadvantages including cost burden, and difficulty in implementation and use. However, the present invention facilitates determining an intention depending on a location of the user by using a microphone receiving a voice command. Further, the present invention may provide an enhanced service to the user by using location information of the user and utterance direction information to give a command.

Such a method can be used for various services including an intelligent service (smart home, smart building, etc.) based on technologies such as a sensor network, Machine to Machine (M2M), Machine Type Communication (MTC), and Internet of Things (IoT), digital education, security and safety related services, and the like.

The invention claimed is:

1. A location-based voice recognition system comprising:
    a plurality of voice command receiving devices including at least one microphone; and
    a sensor network control device connected with the plurality of voice command receiving devices through a sensor network,
    wherein the sensor network control device includes
    a sensor location determining unit determining relative locations of the plurality of voice command receiving devices,
    a user location calculating unit calculating a location of a user based on the relative locations,
    an utterance direction calculating unit calculating a converted voice magnitude based on voice magnitudes of the plurality of respective voice command receiving devices and determining an utterance direction range of the user based on the converted voice magnitude, and
    a target device selecting unit selecting a target voice command receiving device as a target of a voice command among the plurality of voice command receiving devices according to the utterance direction range,
    wherein the converted voice magnitude is a voice magnitude when it is assumed that the plurality of voice command receiving devices is at the same distance from the user;
    wherein the target device learning unit performs machine learning on the voice command of the user by using the voice command history including the success or failure of the voice command which is determined by the user's location information, utterance direction, and whether to utter a continuous voice command of the same content in the same utterance direction during a specific time period or whether there is a negative word in the continuous command;

wherein the target device determining unit determines the content of the voice command according to the probability of each voice command based on the user's speech direction, location information, and whether the voice command is successful based on the result of the machine learning.

2. The location-based voice recognition system of claim 1, wherein the utterance direction calculating unit acquires the voice magnitudes of the plurality of respective voice command receiving devices by using a sound attenuation model and thereafter, calculates the converted voice magnitude based on the voice magnitudes of the plurality of respective voice command receiving devices.

3. The location-based voice recognition system of claim 2, wherein the sound attenuation model is based on an influence of a housing of the voice command receiving device or directivity of the microphone.

4. The location-based voice recognition system of claim 1, wherein the sensor location determining unit calculates and determines the relative locations of the plurality of voice command receiving devices based on a magnitude of a beacon signal of at least one voice command receiving device among the plurality of voice command receiving devices.

5. The location-based voice recognition system of claim 1, wherein an utterance direction range of the user is determined as a predetermined range centering on the direction in which the converted voice magnitude is largest.

6. The location-based voice recognition system of claim 1, wherein when a voice command receiving device which is in the direction in which the converted voice magnitude is largest and a voice command receiving device in which the converted voice magnitude is second largest are neighboring to each other, the utterance direction range of the user is determined as a predetermined range centering on a weight center or intermediate angle between the voice command receiving device which is in the direction in which the converted voice magnitude is largest and the voice command receiving device which is in the direction in which the converted voice magnitude is second largest.

7. The location-based voice recognition system of claim 1, wherein the target device selecting unit receives a location of an additional element and selects the target voice command receiving device based on the location of the additional element.

8. The location-based voice recognition system of claim 1, wherein the target device selecting unit includes a target device learning unit and a target device determining unit and the target device learning unit includes attribute information including relative or absolute location information of the voice command receiving devices 210 and 220, information for functions, clustering information, an operation sequence of the functions, and a voice command history.

9. The location-based voice recognition system of claim 8, wherein the voice command history includes user information, an utterance direction, utterance contents, and whether to succeed in the voice command and is stored whenever the voice command is uttered.

10. The location-based voice recognition system of claim 1, wherein the content of the voice command includes corresponding user information, target voice command receiving device information, and operation of the command receiving device.

11. The location-based voice recognition system of claim 1, wherein the target device selecting unit determines the content of the voice command based on the machine learning when the voice command is an unclear command, and wherein the ambiguous command includes a voice command including a pronoun or a voice command without information on a target voice command receiving device.

12. A location-based voice recognition method in a location-based voice recognition system including a plurality of voice command receiving devices including at least one microphone and a sensor network control device connected with the plurality of voice command receiving devices through a sensor network, the method comprising:

determining relative locations of the plurality of voice command receiving devices;

calculating a location of a user based on the relative locations;

calculating a converted voice magnitude based on voice magnitudes of the plurality of respective voice command receiving devices and determining an utterance direction range of the user based on the converted voice magnitude; and selecting a target voice command receiving device as a target of a voice command among the plurality of voice command receiving devices according to the utterance direction range, wherein selecting the target voice command receiving device includes:

performing machine learning on the user's voice command by using the user's location information and a voice command history including the range of utterance direction and success or failure of the voice command; and determining the content of the voice command based on the user's speech direction, location information, and probability of each voice command based on the success or failure of the voice command based on the machine learning, and determining the target voice command receiving device based on the determined content of the voice command, wherein the converted voice magnitude is a voice magnitude when it is assumed that the plurality of voice command receiving devices is at the same distance from the user, and wherein the success or failure of the voice command is determined according to whether or not a continuous voice command having the same content is uttered in the same range of utterance direction for a specific time period or whether there is a negative word in the continuous command.

13. The location-based voice recognition method of claim 12, wherein the determining of the utterance direction range of the user includes acquiring the voice magnitudes of the plurality of respective voice command receiving devices by using a sound attenuation model and thereafter, calculating the converted voice magnitude based on the voice magnitudes of the plurality of respective voice command receiving devices.

14. The location-based voice recognition method of claim 13, wherein the sound attenuation model is based on an influence of a housing of the voice command receiving device or directivity of the microphone.

15. The location-based voice recognition method of claim 12, wherein the selecting of the target voice command receiving device includes receiving a location of an additional element and selecting the target voice command receiving device based on the location of the additional element.

16. The location-based voice recognition method of claim 12, wherein the determining the relative position includes:
- emitting sound of a specific frequency for each of the plurality of voice command receiving devices;
- receiving sound of a specific frequency from which the microphones of the plurality of voice command receiving devices are emitted;
- calculating and determining the relative positions of the plurality of voice command receiving devices based on the received loudness of a specific frequency.

17. The location-based voice recognition method of claim 12, wherein the range of utterance direction of the user is determined to be a predetermined range centering on a direction in which the converted speech volume is largest.

18. The location-based voice recognition method of claim 12, wherein the utterance direction range of the user is determined to be a predetermined range centered on an intermediate angle between the voice command receiving device having the largest converted voice size and the voice command receiving device having the second largest converted voice size, when the 'voice command receiving device having the largest converted voice size' and the 'voice command receiving device having the second largest converted voice size' are adjacent to each other.

19. The location-based voice recognition method of claim 12, wherein the voice command history further includes user information, speech content, and whether or not the voice command was successful, and is stored each time the voice command is uttered.

20. The location-based voice recognition method of claim 12, wherein the content of the voice command includes corresponding user information, target voice command receiving device information, and operation of the command receiving device.

21. The location-based voice recognition method of claim 12, wherein the selecting the target voice command receiving device determines the content of the voice command based on the machine learning when the voice command is an unclear command, and
- wherein the ambiguous command includes a voice command including a pronoun or a voice command without information on a target voice command receiving device.

* * * * *